United States Patent [19]
Masters et al.

[11] Patent Number: 5,927,647
[45] Date of Patent: Jul. 27, 1999

[54] BLOCKER DOOR FRAME PRESSURE STRUCTURE FOR TRANSLATING COWL OF CASCADE THRUST REVERSER FOR AIRCRAFT JET ENGINE

[75] Inventors: Abbott R. Masters, Lemon Grove; Ruben Garcia, El Cajon; Norman J. James, San Diego, all of Calif.

[73] Assignee: Rohr, Inc., Chula Vista, Calif.

[21] Appl. No.: 08/936,711

[22] Filed: Sep. 24, 1997

[51] Int. Cl.$^6$ ........................................... F02K 1/72
[52] U.S. Cl. ........................ 244/110 B; 239/265.19; 60/226.2
[58] Field of Search ................... 244/110 B; 239/265.29, 239/265.27, 265.19, 265.31; 60/226.2

[56] References Cited

U.S. PATENT DOCUMENTS

| | | | |
|---|---|---|---|
| 3,500,645 | 3/1970 | Hom | 60/226.2 |
| 4,407,120 | 10/1983 | Timms | 60/226.2 |
| 4,533,098 | 8/1985 | Bonini et al. | 244/110 B |
| 4,564,160 | 1/1986 | Vermilye | 244/110 B |
| 4,807,434 | 2/1989 | Jurich | 60/226.2 |
| 4,998,409 | 3/1991 | Mutch | 60/226.2 |

Primary Examiner—Galen L. Barefoot
Attorney, Agent, or Firm—Patrick J. Schlesinger; Jay M. Cantor

[57] ABSTRACT

An improvement in the translating cowl of a cascade type thrust reverser for a high bypass aircraft jet engine that provides a novel blocker door frame arrangement for the inner panel of such cowl. A plurality of forwardly opening spaced circumferentially arranged apertures are provided in the inner panel of the translating cowl and an outer edge portion of a one piece imperforate blocker door frame is sealingly inserted in each such opening by extending the edge portion between the facing sheets of the inner panel for bonding thereto. Each blocker door frame is configured to receive a blocker door that is hinged to such frame at the forward portion of the frame and which is connected by a drag link to a core cowl of the aircraft engine. An annular reinforcing section is secured to the inner surfaces of the blocker door frames and to an end slider portion of the translating cowl for longitudinal reciprocal motion. Another reinforcing section is secured to the forward portion of the blocker door frames and receives an annular seal that engages a fixed portion of the thrust reverser to preclude leakage of the fan duct air flow when the translating cowl is stowed. The two reinforcing sections increase the hoop strength and bending stiffness of the inner panel and integral blocker door frames.

18 Claims, 4 Drawing Sheets

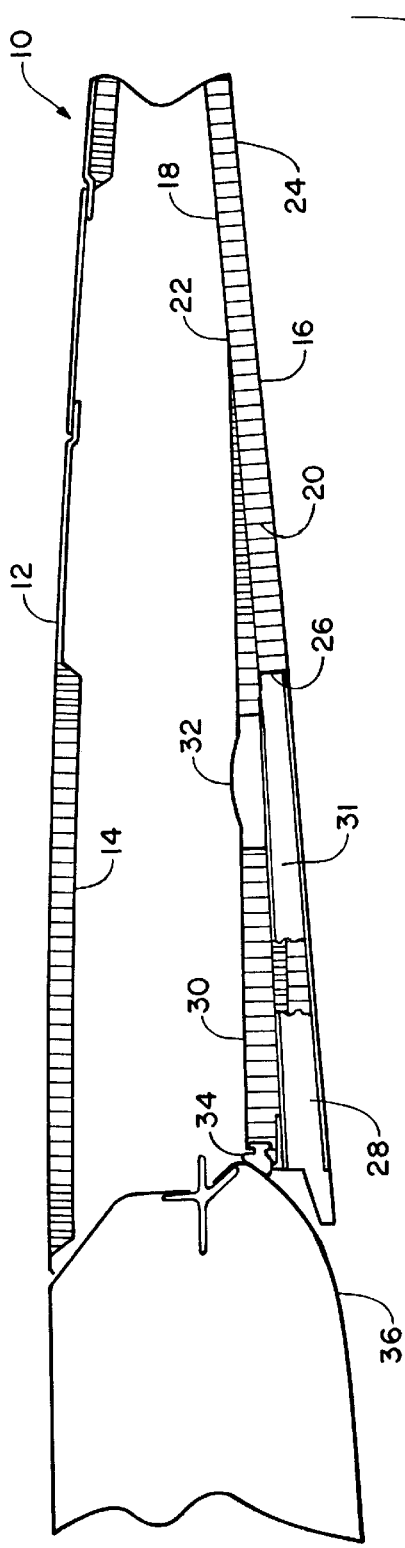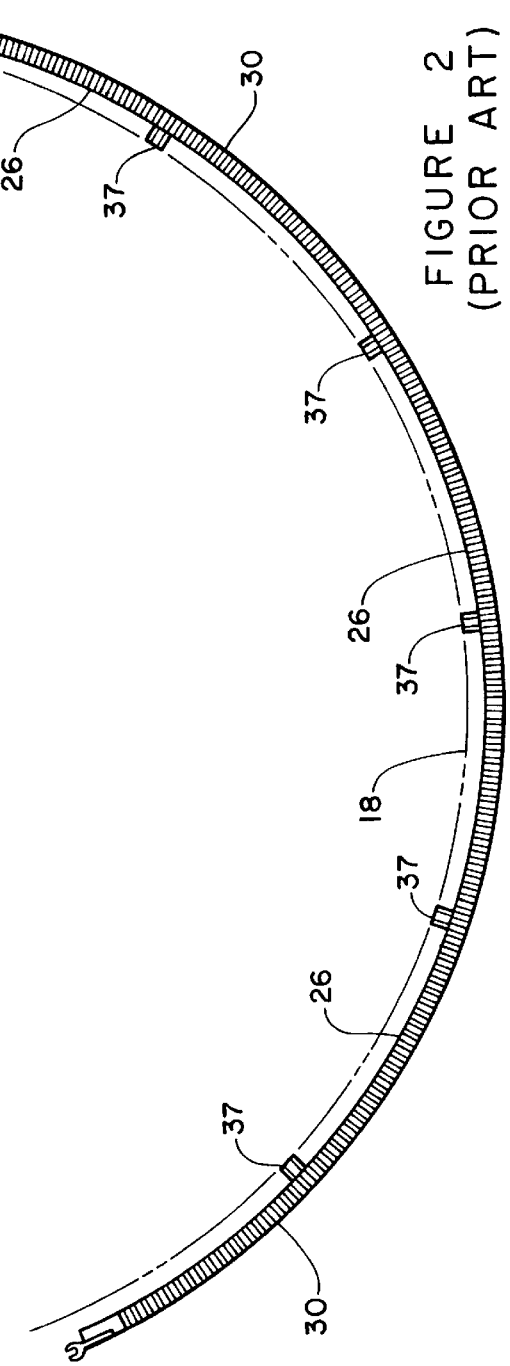
FIGURE 1 (PRIOR ART)
FIGURE 2 (PRIOR ART)

BLOCKER DOOR FRAME PRESSURE STRUCTURE FOR TRANSLATING COWL OF CASCADE THRUST REVERSER FOR AIRCRAFT JET ENGINE

BACKGROUND OF THE INVENTION

This invention relates generally to an improvement in a thrust reverser for an aircraft jet engine, and more particularly but not by way of limitation, to a novel blocker door frame pressure structure for a translating cowl of a cascade type thrust reverser for an aircraft jet engine.

In the field of thrust reversers for large aircraft jet engines, a common type is one generally known as a cascade thrust reverser which is intended for application to a high bypass gas turbine jet engine. Such a cascade thrust reverser may be deployed upon landing of the aircraft to reverse the fan bypass air forwardly and to thereby slow the speed of the aircraft upon landing and to reduce the roll of the aircraft along the runway. A cascade thrust reverser commonly includes a translating cowl which may translated aft upon landing to deploy a plurality of blocker doors arranged circumferentially around the inner panel of the translating cowl into a bypass fan air blocking position. As such blocking doors are deployed as the translating cowl is moved aft, a plurality of cascades are exposed which redirect the blocked bypass fan air forwardly and outwardly in a controlled manner to provide braking force for the aircraft upon landing.

The translating cowl interfaces at its forward edge with the fixed structure of the thrust reverser, namely the torque box, at its aft edge with the common nozzle, at its upper edges with the pylon, and also interfaces at its lower edge with other thrust reverser structure.

The cascade thrust reverser includes, in addition to the translating cowl, a fixed structure which supports the translating cowl as it is slid aft, thrust reverser actuator means which cooperate with the fixed fan cowl to slide the translating cowl to deployed and stowed positions, and a trailing structure which cooperates with the core cowl surrounding the gas turbine jet engine to provide a nozzle for the bypass fan air.

The outer panel of the translating cowl provides a smooth airflow surface and is presently fabricated from a graphite/epoxy, honeycomb core bondment with various fittings and structure for attachment to the inner panel of the translating cowl, the inner fixed structure and the actuators for the translating cowl.

The inner panel of the translating cowl in its stowed position provides a smooth airflow surface for fan bypass air and maintains the bypass air pressure by means of a honeycomb pressure shelf structure which cooperates with appropriate seal means to preclude bypass fan air from leaking through the interface between fixed structure of the thrust reverser termed the torque box and the translating cowl. The pressure shelf and inner panel structure is provided with pockets for receiving the blocker doors when they are in a stowed position. These pockets for receiving the blocker doors are currently provided by bonding together a number of detail sheet metal and honeycomb core detail parts that are adhesively bonded "piggy-back" into the same basic inner panel to make a inner panel bonded assembly having an integral pressure shelf.

Commonly a bonding tool termed a "throw in block" has secured to it a number of such detail parts and is positioned in the inner panel assembly for the bonding operation, after which the throw in tool is removed from the inner panel bonded assembly. Also, after bonding, the openings for receiving the machined blocker doors are hand routed into the pocket assemblies. The panel termed the integral pressure shelf is bonded to the inner panel to seal off any fan air that might tend to leak into the interior of the translating cowl. The pressure shelf may be constructed as a separate panel and mechanically attached to the inner panel. In addition to being time consuming and expensive to build, this construction also causes difficultly in the interchangibility of the plurality of blocker doors to the thrust reverse since a machined door is required, in this arrangement, to fit into a hand routed opening, the dimensions of which can vary in manufacture.

Accordingly, the purpose of the present invention is to resolve the shortcomings of the present cascade type thrust reverser translating cowl by replacing the pressure shelf structure and the included blocker door pocket construction of the prior art with a novel one piece door frame detail having an integral web to seal off fan air from leakage there by and thereby materially improving the manufacturability and simplifying the construction by substantially reducing the part count while also reducing the cost of the translating cowl.

SUMMARY OF THE INVENTION

The foregoing problems are overcome and other advantages are provided by a new and improved blocker door frame and pressure shelf structure.

Briefly stated, the present invention contemplates an improved translating cowl for a cascade type thrust reverser wherein the present pressure shelf structure and blocker door frames are replaced by one piece blocker door frames, each having an integral closure and web to seal off fan air from leakage thereby. Such a translating cowl is deployed aft upon landing of the aircraft to rotate a plurality of hinged blocker doors carried by the translating cowl to a fan air blocking position by means of drag links coupled to such blocker doors and to the core cowl surrounding the central body structure of the engine. As the translating cowl is deployed and the blocker doors intercept the fan air and turn it outwardly such reversed fan air flows through a cascade structure that has been uncovered by the deployment of the translating cowl to turn and redirect such fan air forwardly and outwardly in a predetermined manner.

The translating cowl includes an inner surface panel having a leading edge and a trailing edge. The inner surface panel preferably includes a honeycomb core panel that has spaced facing sheets bonded to a suitable honeycomb core and which is provided with a plurality of spaced circumferentially arranged apertures, each of which apertures provides an opening at the leading edge of the inner surface panel. A one piece blocker door frame is inserted in each aperture by having an edge portion that extends between the facing sheets of the honeycomb panel and which is preferably adhesively bonded to such facing sheets. Each blocker door frame is configured to receive a blocker door in a position that is spaced from the direct flow of the fan duct air flow. Each blocker door frame has a blocker door hingedly connected to a forward portion, which blocker door is also connected by means of a drag link to the core cowl of the central engine structure. The hinge structure may also be an integral portion of each novel door frame.

The blocker door frames are preferably interconnected on their outer surfaces with a reinforcing means that is secured to such frames in a direction transverse to the fan duct air flow to increase the hoop strength of the translating cowl and the bending stiffness resistance of the inner panel and the integral blocker door frames to the pressure of the fan duct air flow. The reinforcing means may be in the form of a hat section, a "T" section, a "Z" section, an "L" section, or any suitable reinforcing section or combination of sections. The blocker door frames are also provided at their leading edges with a seal means that cooperates with torque box of the fixed structure of the thrust reverser when the translating cowl is in a stowed position to preclude and duct flow from leaking between the translating cowl any such fixed structure during flight. The seal means also aids in increasing the hoop strength and bending stiffness of the inner panel and integral blocker door frames.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a cross section of a portion of a prior art translating cowl which includes the previously used arrangement for incorporating blocker door frames into the translating cowl of a cascade type thrust reverser.

FIG. 2 is a partial cross section of the prior art translating cowl arrangement seen in FIG. 1.

Similar numerals refer to similar parts in all FIGURES.

DETAILED DESCRIPTION OF THE DRAWINGS

Figure 3:
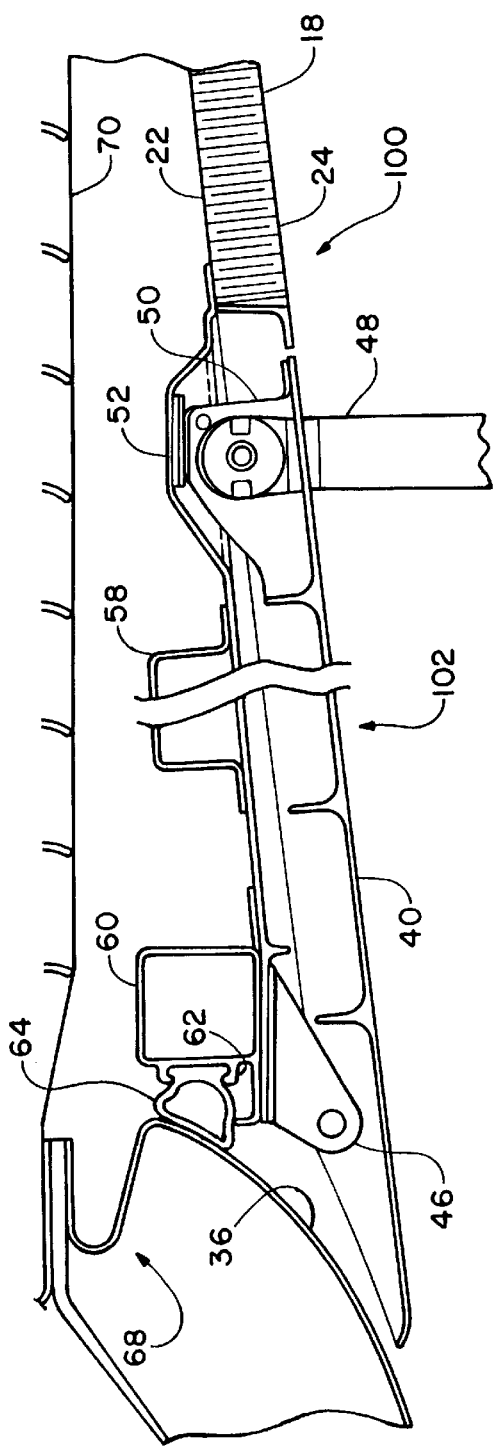
FIG. 3 is a cross section of a translating cowl which incorporates a blocker door frame arrangement constructed in accordance with a preferred embodiment of the present invention.
Figure 4:
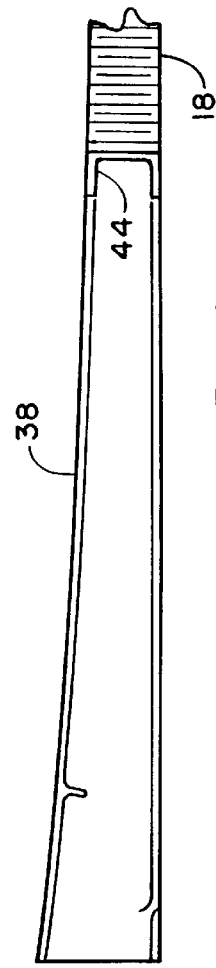
FIG. 4 is a partial cross section detail view of the arrangement seen in FIG. 3.
Figure 5:
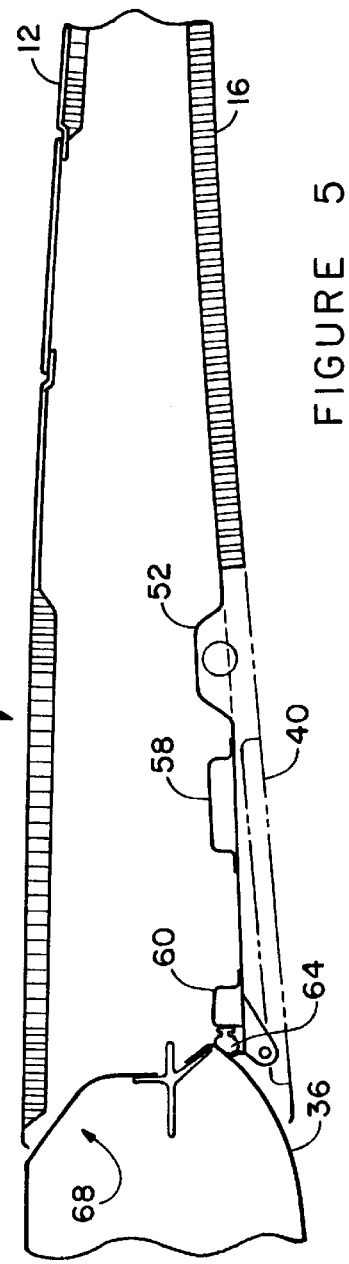
FIG. 5 is an additional cross section of the improved translating cowl arrangement seen in FIG. 3.

Referring now to the drawings in detail in which like numerals refer to like elements, FIGS. 1 and 2 disclose a cascade type thrust reverser for a bypass aircraft engine having a translating cowl 10 constructed in accordance with the teachings of the prior art. FIG. 1 is a simplified cross section of a translating cowl 10 which is provided with a graphite/ epoxy outer sleeve 12 which has an advanced composite honeycomb core panel portion 14 adhesively bonded thereto. The sleeve 12 may also be metallic. Alternatively, the honeycomb core panel portion 14 may be replaced by a conventional sheet metal skin and frame construction, as is well known in the art. The translating cowl 10 has an inner sleeve or panel 16 which provides a smooth surface for the bypass fan air. The inner panel 16 includes an aluminum acoustic panel 18 having a honeycomb core 20 that is adhesively bonded to an imperforate inner sheet 22 and to an suitably perforated outer sheet 24 for sound attenuation purposes as is known in the art. The inner panel 18 is provided with a plurality of spaced circumferentially arranged pockets or openings 26 for receiving blocker doors, not shown for ease of illustration. The openings 26 and a portion of the inner panel 18 is backed by another aluminum honeycomb core adhesively bonded panel 30 that covers the pocket openings 26. As is seen, the panel 30 is trimmed or tapered to reduce weight and is adhesively bonded to the panel 18. The panel 30 is known in the art as a "pressure shelf" since it acts to not only seal off any leakage of the fan air stream through the openings 26 and provides additional hoop strength and bending stiffness to the translating cowl 10.

In construction, the panel 30 and various details 32 are often bonded to the inner panel 18 at the time of the bonding together of the inner panel 18. After such bonding operation is completed the openings 26 are formed in the inner panel 18 by hand routing. Since such openings 26 are performed by hand it is difficult to achieve uniformity in size of such pockets at a reasonable cost. Each of the pockets 26 has had a very significant number of detail aluminum parts 28 adhesively bonded in place to form a blocker door frame 31 for receiving a rotatable blocker door (not shown) in a manner well known in the art. The pressure shelf bond panel 30 is additionally provided with a resilient seal 34 at its leading edge which cooperates with the fixed portion or torque box 36 of the thrust reverser.

While such an arrangement is satisfactory from a performance standpoint, it is apparent that such construction is time consuming and expensive to manufacture.

As is seen in FIG. 2, the pockets 26 and blocker door frames 30 are separated by islands 37 which cooperate with the panels 18 and 30 to improve the structural integrity of the translating cowl 10. The description of the prior art translating cowl is incorporated in the description of the present invention for the purpose of showing portions of a cascade type thrust reverser that are incorporated in the present invention.

Referring now to FIGS. 3–8, it will be seen that the improved translating cowl 100 of the present invention contemplates an inner panel 18 which receives a plurality of spaced one piece blocker door frames 38, each of which frames 38 is adapted to receive a blocker door 40. Each frame 38, as will be seen in later FIGURES, is formed as an open pan to receive each door 40 and may be made by casting and/or machining as desired. The inner panel 18 of the improved translating cowl 100 is provided with a plurality of spaced circumferentially arranged apertures 42, per FIGS. 6–8, which are open at the leading edge of the panel 18 for receiving the blocker door frames 40. The honeycomb core 20 of the panel 18 is relieved at the portions of the panel 18 surrounding each opening 42 so that a peripheral edge portion 44 of the frame 38 may be inserted between the facing sheets 22 and 24 and, preferably, adhesively bonded to such facing sheets so that each one piece blocker door frame 38 becomes an integral portion of the inner surface panel 18 of the translating cowl 100.

Figure 6:
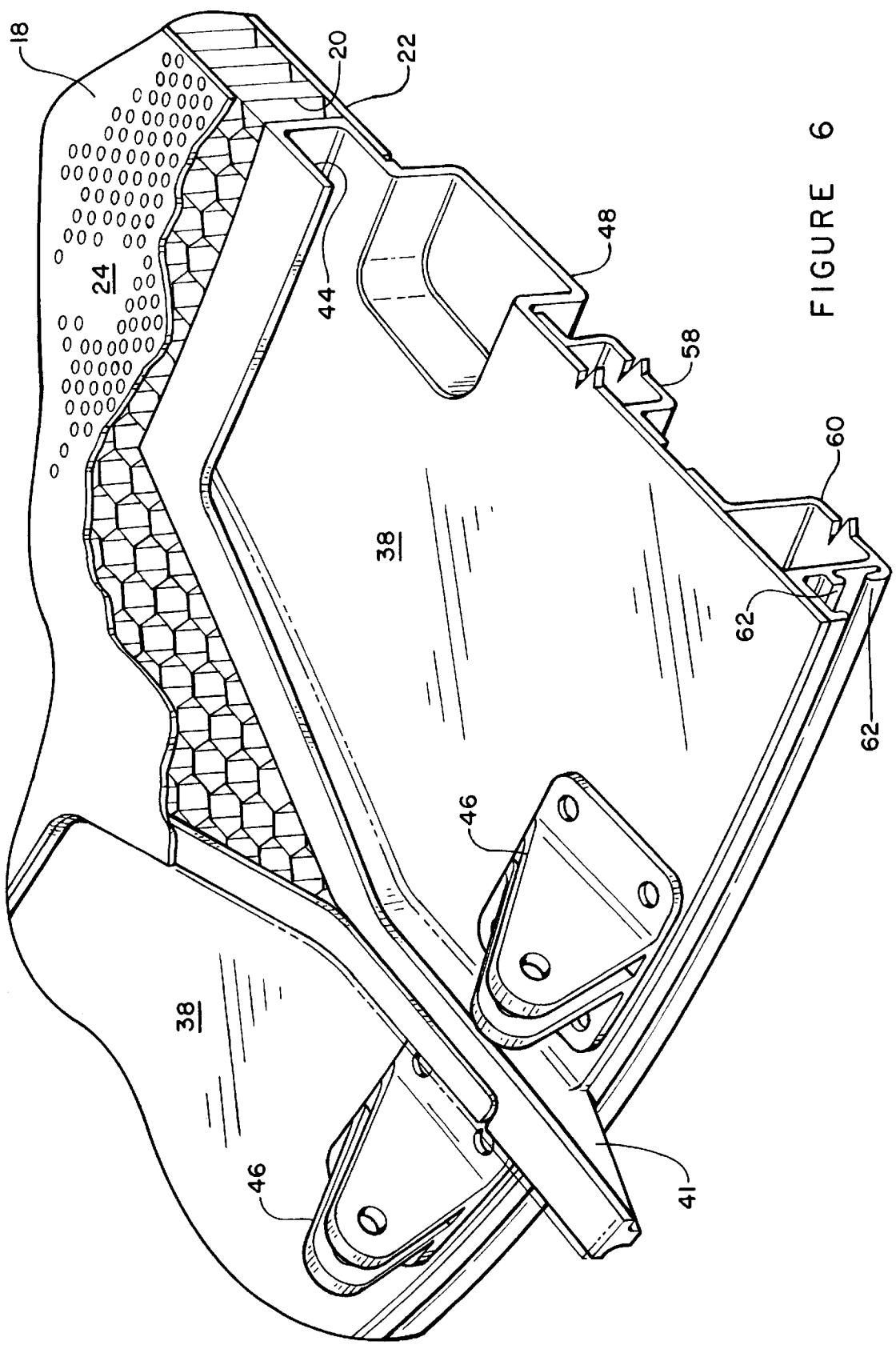
FIG. 6 is a perspective of the blocker door frames and inner panel of FIG. 3 shown partially cut away.

As seen most clearly in FIGS. 3 and 6, each blocker door frame 38 is configured to receive a blocker door 40 in a position in which an outer surface of the blocker door is generally coterminous and co-planar with the surface of the inner panel 18 so as not to interfere with the fan duct air flowing generally in the direction of the arrow shown in FIG. 3. Each blocker door, as seen in FIG. 3, is hingedly secured at its forward end by a suitable hinge fittings 46 secured to the forward edge portion of each blocker frame 40 in any suitable manner, such as riveting. Each blocker door 40 is secured to the core cowl of the central core portion of an aircraft jet engine, not shown, by means of a drag link 48 that is hingedly secured to the aft end of each blocker door 40 by a suitable hinged fitting 50 as is well known in the art. The positioning of the blocker door 40 within the blocker door frame 38 and the hinged connections are conventional. It would also be within the scope of the invention to provide the hinge 46 as an integral part of the door frame 38. Similarly, each blocker door frame 38 is provided with a suitable pocket 52 as seen most clearly in FIGS. 3, 6, and 7, to accommodate the hinged connection 50 when the blocker door 40 is stowed as during flight.

Figure 8:
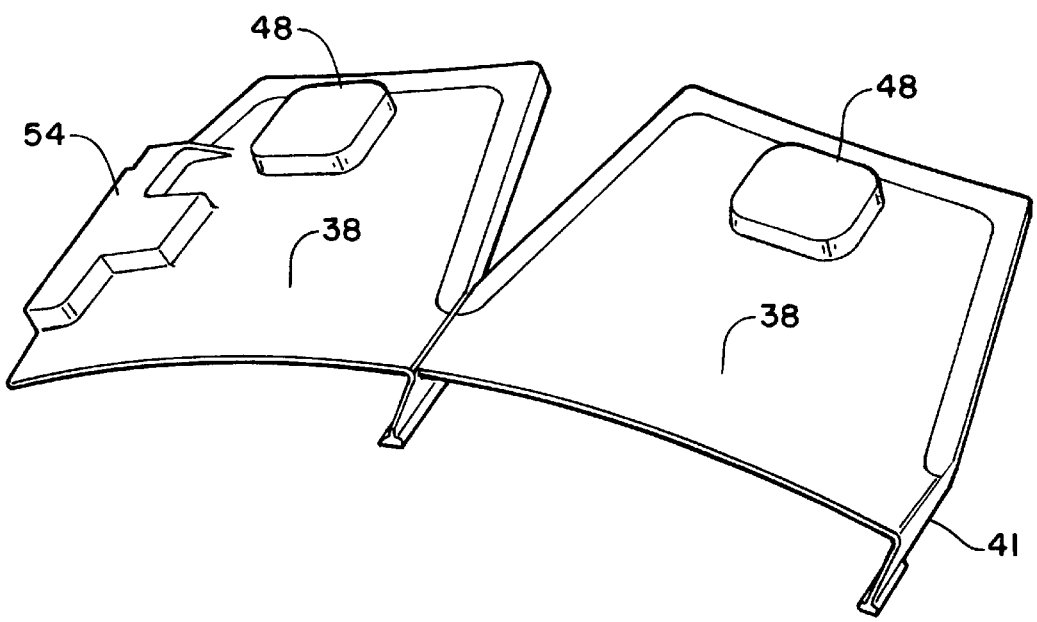
FIG. 8 is an additional simplified view of the arrangement of FIG. 7 which more clearly illustrates some of the details of the blocker door frame arrangement.

Since a plurality of blocker door frames 38 are employed to accommodate a plurality of blocker doors 40, such frames may be secured together at their side walls 41, as seen in FIG. 6, as by riveting. As in common practice the translating cowl 100 is bifurcated with an end blocker door frame 38 being provided with a suitable T-shaped pan down section 54, as seen in FIG. 8, to permit a blocker door frame 38 to be secured in a suitable manner to a long track slider arrangement 56 for longitudinal translation of the translating cowl 100 as is well known in the art.

Figure 7:
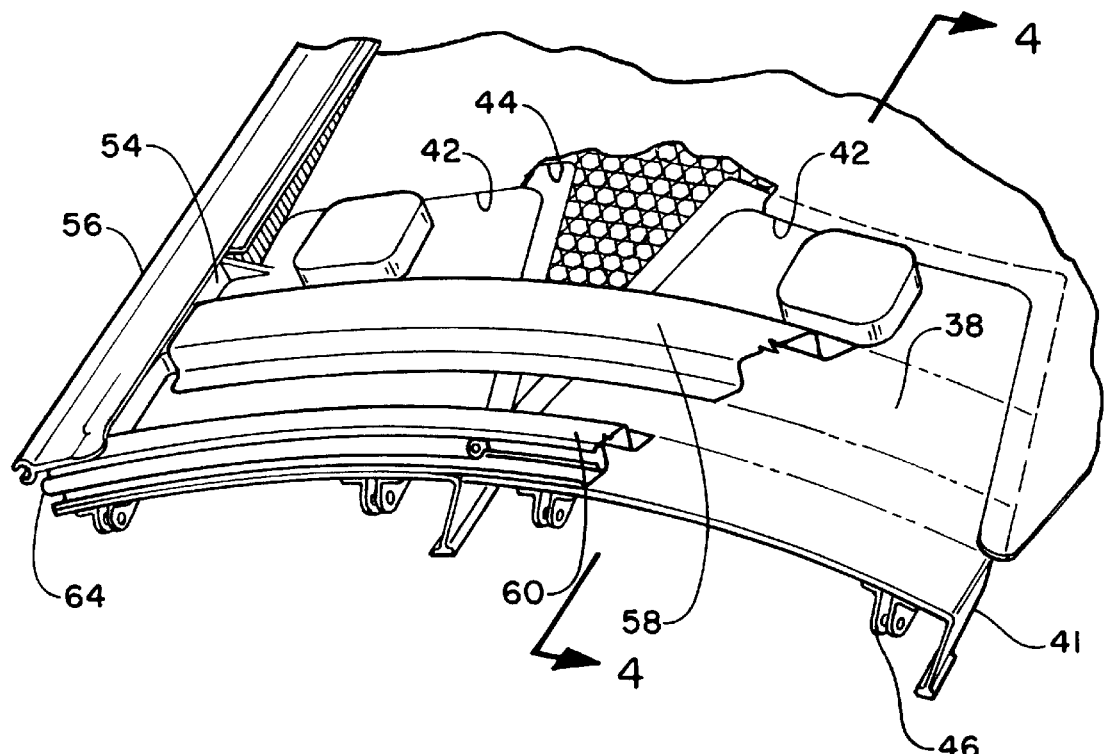
FIG. 7 is a perspective view of the arrangement of FIG. 3 which particularly illustrates the cooperation of the improved blocker door frame arrangement with the inner panel of the translating cowl.

As also seen in FIG. 7, the section 54 also cooperates with a suitable reinforcing means, shown in the form of a suitable hat shaped section 58 that is secured to such section 54 and to the blocker frames 38 in any suitable manner, such as by riveting. The reinforcing section 58 is disposed on the blocker door frames 38 is a position that is transverse to the direction of the fan duct air flow so as to increase the hoop strength and bending stiffness of the inner panel 18 and integral door frames 38.

Also, as seen in FIGS. 3 and 7, the blocker door frames 38 are provided on their leading edge portions with an extruded metal hat section 60 or similar construction that is suitably secured to such fames 58 and to other portions of the translating cowl 100 such as the track slider structure 56 by any suitable means, such as riveting. The section 60, which is disposed transversely to the direction of the fan duct air flow, is provided with a pair of spaced forwardly facing flanges 62 for receiving and retaining a suitable bulb seal 64 that sealingly contacts a fixed portion 36 of the fixed bulkhead 68 of the cascade thrust reverser 102. When the translating cowl 100 is stowed, such as in flight, the seal 64 is slightly compressed against the fixed portion or torque box 66 to preclude fan air from leaking from the fan duct to cause the cascade thrust reverser 102 to be less efficient. Preferably, the section 60 is secured to the blocker door frames 38 by the same rivets that are used to attach the blocker door hinge fittings 46 to the blocker door frames 38. The hat section 60 also is instrumental in increasing the hoop strength and bending stiffness of the panel 18 and integral blocker door frames 32.

As seen in FIG. 3, the cascade thrust reverser 102 includes suitable cascade sections 70, shown only partially, for deflecting the duct fan air outwardly and forwardly in a desired manner when the translating cowl 100 is translated aft and the drag links 48 draw the blocker doors 40 downwardly and inwardly against the core cowl (not shown) of the aircraft jet engine as is well known in the art.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. In a translating cowl of a cascade type thrust reverser for a bypass aircraft jet engine, the combination comprising:

an inner panel providing an inner surface for such translating cowl for the purpose of providing a bypass duct for the fan air of a bypass aircraft jet engine, said inner panel comprising a single layer honeycomb core panel having spaced inner and outer facing sheets and having a plurality of spaced circumferentially arranged apertures provided therein, and a plurality of spaced circumferentially arranged one piece blocker door frames, each door frame having an outer surface impervious to air flow that is shaped to operatively receive a rotatable blocker door and which is sealingly inserted into one of said apertures in said honeycomb core panel.

2. The translating cowl of claim 1 wherein said plurality of blocker door frames are further provided with a reinforcing means fixedly secured on their inner surfaces to increase the hoop strength of said inner panel.

3. The translating cowl of claim 2 wherein said reinforcing means comprises an annular reinforcing member fixedly secured to the inner surface of each of said blocker door frames in a position transverse to the flow of air through the bypass air duct.

4. The translating cowl of claim 2 which further includes an annular seal means secured to the forward inner surfaces of said blocker door frames in a position transverse to the air flow through the bypass duct whereby it may sealingly engage a fixed structure of the thrust reverser when said translating cowl is in a stowed position.

5. The translating cowl of claim 1 wherein said spaced facing sheets of said inner panel are bonded at their inner surfaces to a honeycomb core, said honeycomb core panel being relieved at the portion of said honeycomb core panel adjacent to each said blocker door frame to permit an outer edge portion of each said blocker door frame to be inserted into the honeycomb core panel for fixed sealing engagement therewith.

6. The translating cowl of claim 5 wherein the edge portion of each said blocker door frame that is inserted into the honeycomb core panel is adhesively bonded to the inner surfaces of said spaced facing sheets of the honeycomb core panel.

7. The translating cowl of claim 1 wherein each said blocker door frame is provided at its leading edge with a pair of spaced hinge means for hingedly securing a blocker door within said blocker door frame.

8. The translating cowl of claim 5 wherein the honeycomb core panel is provided with a plurality of spaced perforations in its outer facing sheet whereby fan duct air may communicate with the cells of the honeycomb core for sound attenuation.

9. In a translating cowl for a cascade type thrust reverser that includes a forward fixed structure having a torque box for a bypass aircraft jet engine, the combination comprising:

an annular inner surface panel having a leading edge and a trailing edge and comprising a single layer honeycomb core panel having spaced facing sheets with one of said facing sheets providing a portion of the wall forming a duct for the bypass fan air flow for an aircraft jet engine, said annular inner surface being provided with a plurality of spaced circumferentially arranged apertures, each of said apertures providing an opening at the leading edge of said inner surface panel, and a one piece air impervious blocker door frame sealingly positioned in and completely filling each of said apertures, each blocker door frame being configured to hingedly receive a blocker door whereby when the translating cowl is in a stowed position each blocker door is positioned within said blocker door frame so as to receive only a grazing air flow from said fan duct air flow.

10. The translating cowl of claim 9 wherein each said blocker door frame is positioned in each opening in said inner panel by having an edge portion that is inserted into the honeycomb core panel between said spaced facing sheets.

11. The translating cowl of claim 10 wherein each said edge portion of each of said blocker door frames is adhesively bonded to said spaced facing sheets of said honeycomb core panel.

12. The translating cowl of claim 11 is provided with an inner reinforcing band means that bridges said openings in said panel and is fixedly connected to each of said blocker frames whereby additional hoop strength is provided to the inner panel of said translating cowl in resistance to the air pressure provided by the fan duct air flow.

13. The translating cowl of claim 12 wherein the inner surface panel is further provided at its leading edge with seal means that sealing engages the torque box of the fixed structure of the cascade thrust reverser in its stowed position.

14. The translating cowl of claim 9 wherein the facing sheet of said honeycomb core panel providing a fan duct wall is provided with a plurality of spaced perforations that allow sound attenuating communication of fan duct air flow with cells of said honeycomb core panel.

15. In a translating cowl for a cascade type thrust reverser having a torque box fixed structure and that forms a fan duct for a bypass aircraft jet end and which includes an outer panel surface and inner surface provided by a generally annularly shaped honeycomb core panel having a leading edge and a trailing edge, the improvement of:

a plurality of spaced one piece air impervious blocker door frames that are circumferentially arranged around the leading edge of said honeycomb panel by being sealingly inserted into spaced circumferentially arranged openings extending aft from said leading edge each blocker door frame being configured to hingedly receive a blocker door that in a stowed position does not extend into such fan duct air flow.

16. The arrangement of claim 15 wherein each blocker door frame is sealingly inserted into an opening in said honeycomb panel by inserting an edge portion between facing sheets of said honeycomb core panel for bonding engagement therewith.

17. The arrangement of claim 16 wherein each blocker door frame is provided on its inner surface with band reinforcement means arranged transverse to the fan duct air flow to increase the hoop strength of said inner surface of the translating cowl.

18. The arrangement of claim 17 wherein each blocker door frame is secured at its forward leading edge to a seal means which sealing engages a torque box fixed structure of the cascade thrust reverser when the translating cowl is stowed whereby fan duct air flow is precluded from leaking past the forward edge of said translating cowl while in flight.

* * * * *